(12) United States Patent
Park et al.

(10) Patent No.: US 9,927,844 B2
(45) Date of Patent: Mar. 27, 2018

(54) HINGE ASSEMBLY FOR A COMPUTING DEVICE

(71) Applicant: HEWLETT-PACKARD DEVELOPMENT COMPANY, L.P., Houston, TX (US)

(72) Inventors: Chan Park, Houston, TX (US); Hui Leng Lim, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/306,546

(22) PCT Filed: May 23, 2014

(86) PCT No.: PCT/US2014/039386
§ 371 (c)(1),
(2) Date: Oct. 25, 2016

(87) PCT Pub. No.: WO2015/178930
PCT Pub. Date: Nov. 26, 2015

(65) Prior Publication Data
US 2017/0068285 A1    Mar. 9, 2017

(51) Int. Cl.
*G06F 1/16* (2006.01)
*H05K 7/00* (2006.01)
*F16C 11/04* (2006.01)

(52) U.S. Cl.
CPC ............ *G06F 1/1681* (2013.01); *F16C 11/04* (2013.01); *G06F 1/162* (2013.01); *G06F 1/1618* (2013.01)

(58) Field of Classification Search
CPC .................................................. G06F 1/1637

USPC ...................................................... 361/679.01
See application file for complete search history.

(56) References Cited

U.S. PATENT DOCUMENTS

| 7,646,593 | B2 | 1/2010 | Smejkalova |
| 7,907,393 | B2 | 3/2011 | Sellers |
| 2006/0067039 | A1* | 3/2006 | Williams ............. F16M 11/046 |
| | | | 361/679.09 |
| 2006/0077622 | A1 | 4/2006 | Keely et al. |
| 2010/0007613 | A1 | 1/2010 | Costa |

(Continued)

FOREIGN PATENT DOCUMENTS

| KR | 10-2008-0034646 | 4/2008 |
| KR | 20080034646 A | * 4/2008 |
| KR | 10-123692 | 12/2012 |

OTHER PUBLICATIONS

J Lee, "Samsung Ativ Q packs Android and Windows 8 into a laptop/tablet with 3200 x 1800 pixel screen," Jun. 20, 2013, http://www.wirefresh.com/samsung-ativ-q-packs-android-and-windows-8-into-a-laptoptablet-with-3200-x-1800-pixel-screen/.

*Primary Examiner* — Jerry Wu
(74) *Attorney, Agent, or Firm* — HP Inc Patent Department

(57) ABSTRACT

Examples disclosed herein provide a hinge assembly for a computing device. One example hinge assembly includes a first hinge attached along a back side of a base member of the computing device, and a second hinge attached along a back surface of a display member of the computing device. The hinge assembly includes a first support including a first end and a second end opposite the first end. The first support is attached to the first hinge at the first end and attached to the second hinge at the second end. The support is disposed along the back surface of the display member outside a perimeter of a display surface of the display member.

14 Claims, 5 Drawing Sheets

(56) References Cited

U.S. PATENT DOCUMENTS

2010/0232096 A1    9/2010   Chen
2014/0085795 A1    3/2014   Xia et al.

* cited by examiner

HINGE ASSEMBLY FOR A COMPUTING DEVICE

BACKGROUND

The emergence and popularity of mobile computing has made portable computing devices, due to their compact design and light weight, a staple in today's marketplace. Within the mobile computing realm, notebook computers, or laptops, are one of the most widely used devices and generally employ a clamshell-type design consisting of two members connected together at a common end via one or more hinges, for example. In most cases, a first or display member is utilized to provide a viewable display to a user while a second or base member includes an area for user input (e.g., touchpad and keyboard). In addition, the viewable display may be a touchscreen (e.g., touchscreen laptop), allowing the user to interact directly with what is displayed by touching the screen with simple or multi-touch gestures.

DETAILED DESCRIPTION

Figure 1:
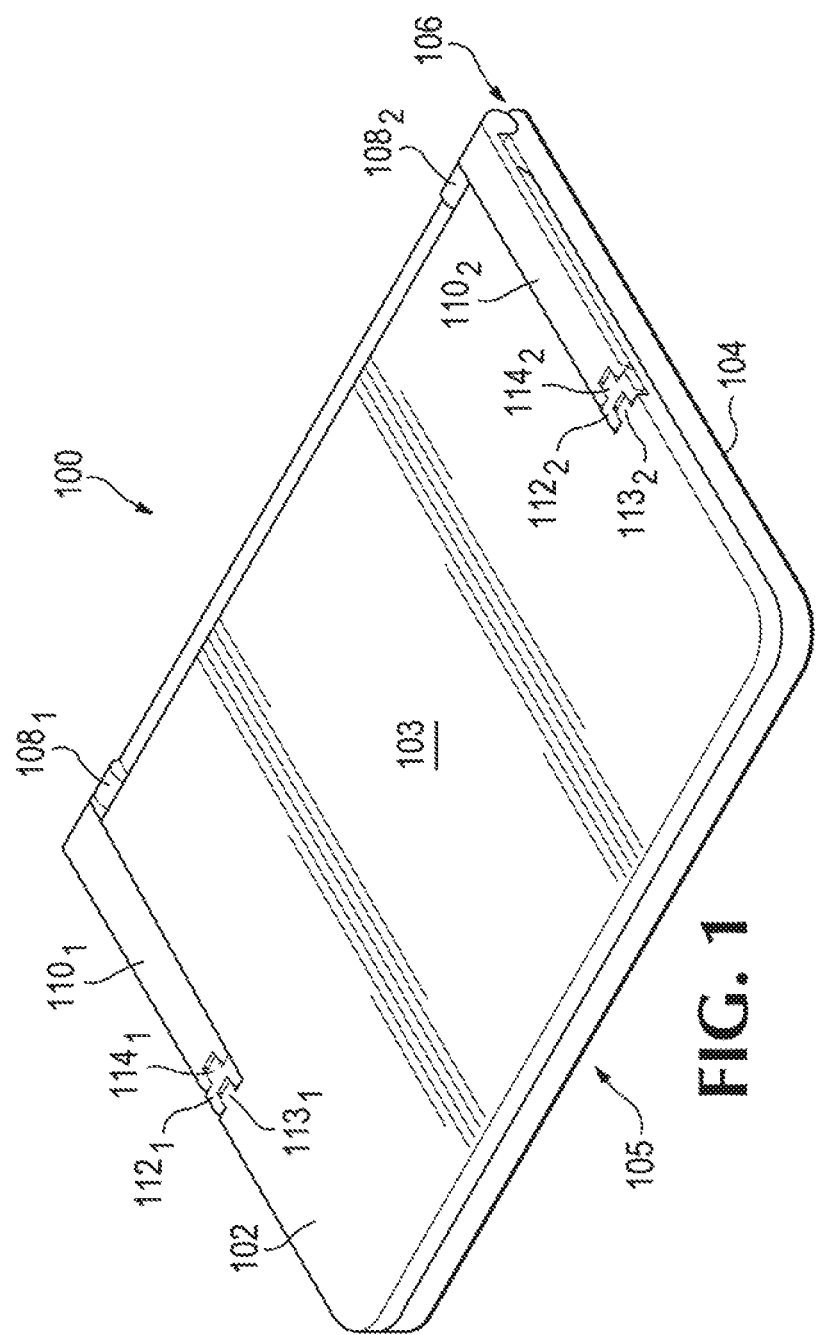
FIG. 1 illustrates a laptop in a closed, folded position, according to one example.

Notebook computers may include a feature that allows the device to be "converted" from one style of use to at least another style of use. For example, a notebook computer may be converted from a laptop mode, where the touchpad and keyboard is used as input, to a tablet mode, where the viewable display is used for both viewing and input. Such devices that serve this dual purpose may be called convertible laptops.

Many form factors exist for convertible laptops. One form factor includes a mechanism that allows the display member to flip over when operating the laptop tablet mode. For example, from its closed position, where the laptop is closed and the viewable display is not visible, the laptop may be opened and the display member may be flipped over via the mechanism to operate the viewable display of the laptop as a tablet. As a result of flipping the display member over, the display member and base member may be collapsed against each other in an open, folded position. In this open, folded position, the touchpad and keyboard of the base member may be covered by the back surface of the display member. A challenge faced by manufacturers of convertible laptops, that allow the display member to flip over, is ensuring the members of the laptop remain thin, in order to meet the ever-increasing drive to make laptops more compact and light weight.

Examples disclosed herein provide a hinge assembly for transitioning a computing device between different modes, such as laptop mode and tablet mode. The placement of the hinge assembly is appropriate for computing devices, such as notebook computers, that are becoming more compact and light weight.

In one example, a computing device includes a base member including a front, side and a back side opposite the front side. The computing device includes a first hinge attached along the back side of the base member, a first support attached to the first hinge, a second hinge attached along the back side of the base member, and a second support attached to the second hinge, wherein the first support and second support are spaced apart. The computing device includes a display member including a display surface and a back surface opposite the display surface. The back surface of the display member is attached to the first and second supports opposite the first and second hinges, respectively, wherein the first and second supports are disposed along the back surface of the display member outside a perimeter of the display surface of the display member.

In another example, a computing device includes a base member, including a front side and a back side opposite the front side, a display member, including a display surface and a back surface opposite the display surface, and a hinge assembly for coupling the base member and the display member. The hinge assembly includes a hinge attached along the back side of the base member and a support attached to the hinge. The back surface of the display member is attached to the support opposite the hinge, wherein the support is disposed along the back surface of the display member outside a perimeter of the display surface of the display member.

In yet another example, a hinge assembly for a computing device includes a first hinge attached along a back side of a base member of the computing device and a second hinge attached along a back surface of a display member of the computing device, wherein the second hinge has two pivot points. The hinge assembly includes a first support including a first end and a second end opposite the first end. The first support is attached to the first hinge at the first end and attached to the second hinge at the second end, wherein the support is disposed along the back surface of the display member outside a perimeter of a display surface of the display member.

With reference to the figures. FIG. 1 illustrates a laptop 100 in a closed, folded position, as an example. The laptop 100 includes a display member 102 and a base member 104 that is joined together via a hinge assembly that includes first and second supports $110_1$, $110_2$. The base member 104 includes a front side 105 and a back side 106 opposite the front side 105. In addition, the base member 104 includes a top surface (e.g., see FIG. 2) that may include input means for operation by a user, such as a keyboard and/or a touchpad. The display member 102 includes a display surface 101 (e.g., see FIG. 2) and a back surface 103 opposite the display surface 101. As an example, the display surface 101 may be used for viewing the video output of the laptop 100, and include input means for operation by a user, such as a touchscreen.

The hinge assembly of the laptop 100 may include a first hinge $108_1$ and a second hinge $108_2$ attached along the back side 106 of the base member 104. The first support $110_1$ may be attached to the first hinge $108_1$ and the second support $110_2$ may be attached to the second hinge $108_2$. As illustrated, the first and second supports $110_1$, $110_2$ may be spaced apart. Opposite the first hinge $108_1$, the first support $110_1$ may be attached to the back surface 103 of the display member 102. Similarly, opposite the second hinge $108_2$, the second support $110_2$ may be attached to the back surface 103 of the display member 102.

As an example, the first and second supports $110_1$, $110_2$ may be attached to the back surface 103 of the display member 102 via third and fourth hinges $112_1$, $112_2$, each hinge having two pivot points. The dual pivot points may allow for the display member 102 to be rotated independently from the first and second supports 110₁, 110₂, as will be further described. Referring to FIG. 1, a first pivot point 113₁ of the third hinge 112₁ may be attached to the back surface 103 of the display member 102, and a second pivot point 114₁ of the third hinge 112₁ may be attached to the first support 110₁. Similarly, a first pivot point 113₂ of the fourth hinge 112₂ may be attached to the back surface 103 of the display member 102, and a second pivot point 114₂ of the fourth hinge 112₂ may be attached to the second support 110₂.

Figure 2:
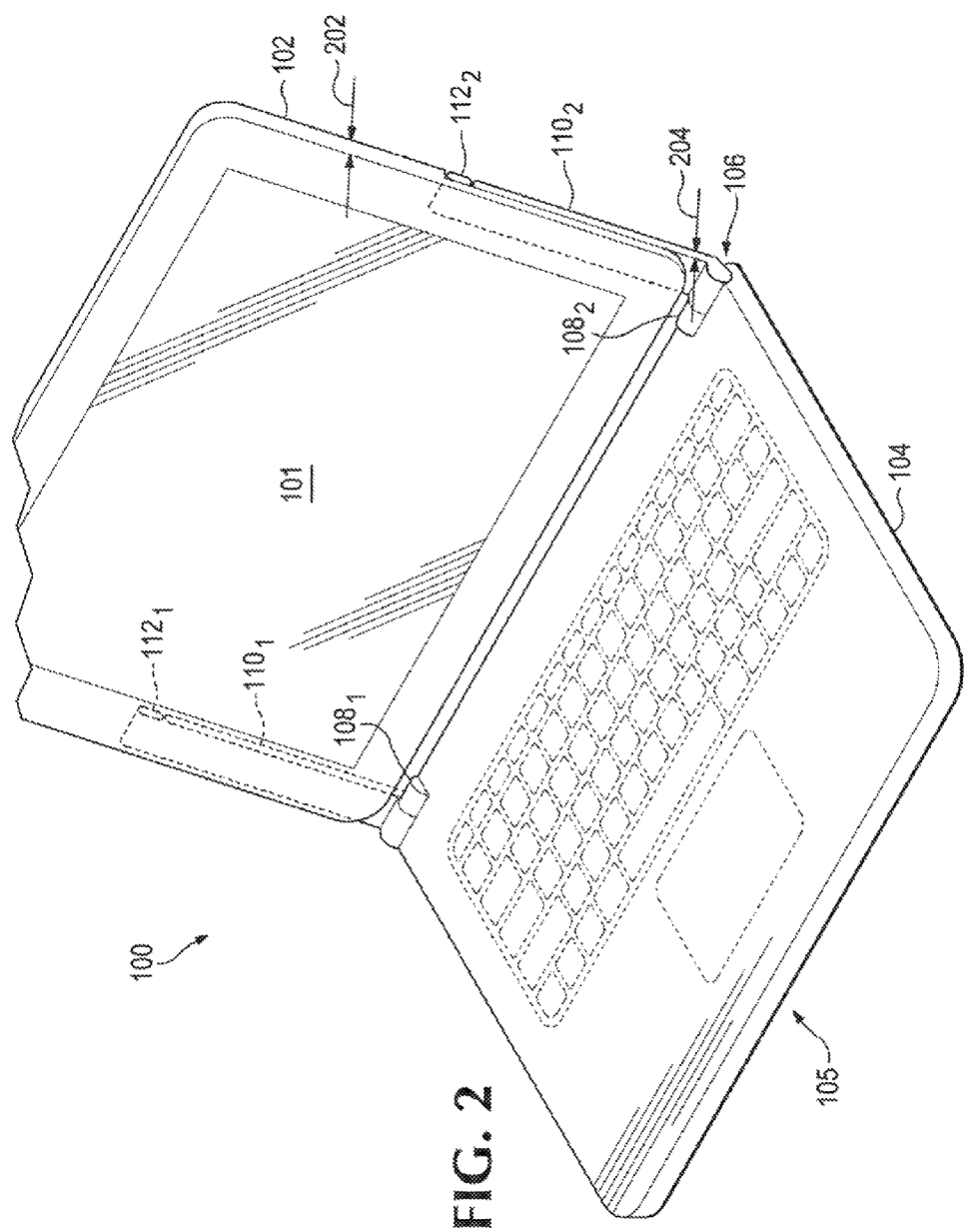
FIG. 2 illustrates the laptop in laptop mode, according to an example.

Opening the laptop 100 from its closed, folded position (e.g., see FIG. 1), the laptop 100 may be used in laptop mode, where the touchpad and/or keyboard is used as input, for example, by adjusting the angle of the display member 102 with respect to the base member 104 so that the display surface 101 is at an appropriate viewing angle for a user. First and second hinges 108₁, 108₂ may allow for the display member 102 to be rotated open from the closed, folded position. As illustrated in FIG. 2, the display member 102 may form an angle with respect to the base member 104, which may be an appropriate angle for the user to operate the laptop 100 in laptop mode.

As an example, the hinge assembly, particularly the first and second supports 110₁, 110₂ of the hinge assembly, may be sized appropriately in order to meet the ever-increasing drive to make laptops more compact and light weight. The placement of the hinge assembly may be taken into consideration, in order to reduce the thickness of the laptop 100, particularly the display member 102 of the laptop 100. Referring to FIG. 2, the first and second supports 110₁, 110₂ may be disposed along the back surface 103 of the display member 102 outside a perimeter of the display surface 101 of the display member 102. By placing the first and second supports 110₁, 110₂ outside the perimeter of the display surface 101, the thickness 204 of the supports 110₁, 110₂ may coincide with (or occupy the same space as) the thickness of the display surface 101 (e.g., the thickness of the LCD panel) along an axis. The thickness 202 of the display member 102 may correspond to the thickness of the display surface 101. As an example, the thickness 204 of the supports 110₁, 110₂ may be less than the thickness 202 of the display member 102, as illustrated. As a result, the thickness 202 of the display member 102 may be limited to the thickness of the display surface 101, and the thickness 204 of the supports 110₁, 110₂ may not add to the thickness 202 of the display member 102. By placing the first and second supports 110₁, 110₂ outside the perimeter of the display surface 101, the thickness 204 of the supports 110₁, 110₂ may not add to the thickness 202 of the display member 102, which corresponds to the thickness of the display surface 101.

When a user operates a convertible laptop in its various modes, it is desirable for the laptop to feel sturdy and rigid. For example, when the user operates the laptop in laptop mode by setting the display member at an appropriate viewing angle, it is not desirable for the display member to fall forwards or backwards as the user operates the laptop. Referring to FIG. 2, the hinges 108₁, 108₂ of the hinge assembly may be friction hinges that provide friction for resisting a torque provided by a user while opening or closing the laptop 100. As mentioned above, the hinges 108₁, 108₂ may allow for the display member 102 to be viewed at a variety of viewing angles. As an example, the hinges 108₁, 108₂ may support the display member 102 any desired open angle with sufficient resistance to allow, for example, touch screen computing.

In addition to the laptop mode illustrated in FIG. 2, FIGS. 3-5 illustrate other ways the laptop 100 may be operated. However, the laptop 100 is not limited to the modes illustrated. The hinge assembly of the laptop 100 may allow for the laptop 100 to be operated in the various modes illustrated. Particularly, a combination of the first and second hinges 108₁, 108₂, and the third and fourth hinges 112₁, 112₂ may allow for the display member 102 to be rotated from the closed, folded position illustrated in FIG. 1 all the way to the open, folded position illustrated in FIG. 5. For example, from its closed position, where the laptop 100 is closed and the display surface 101 is not visible, the laptop 100 may be opened and the display member 102 may be flipped over via the hinge mechanism to operate the display surface 101 of the laptop 100 as a tablet. As a result of flipping the display member 102 over, the display member 102 and base member 104 may be collapsed against each other in the open, folded position. In this open, folded position, the touchpad and keyboard of the base member 104 may be covered by the back surface of the display member 102.

Figure 3:
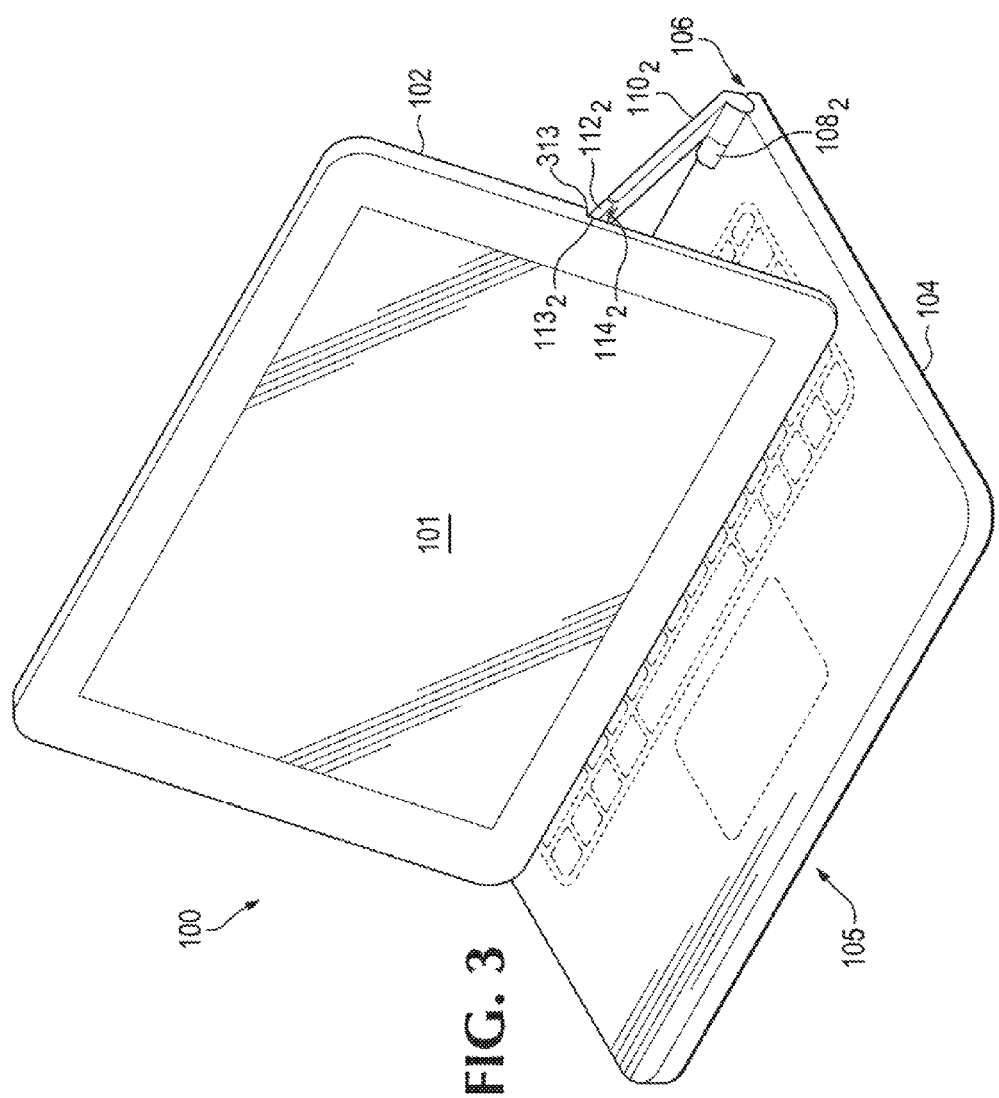
FIG. 3-4 illustrate the laptop in various modes of operation.
Figure 4:
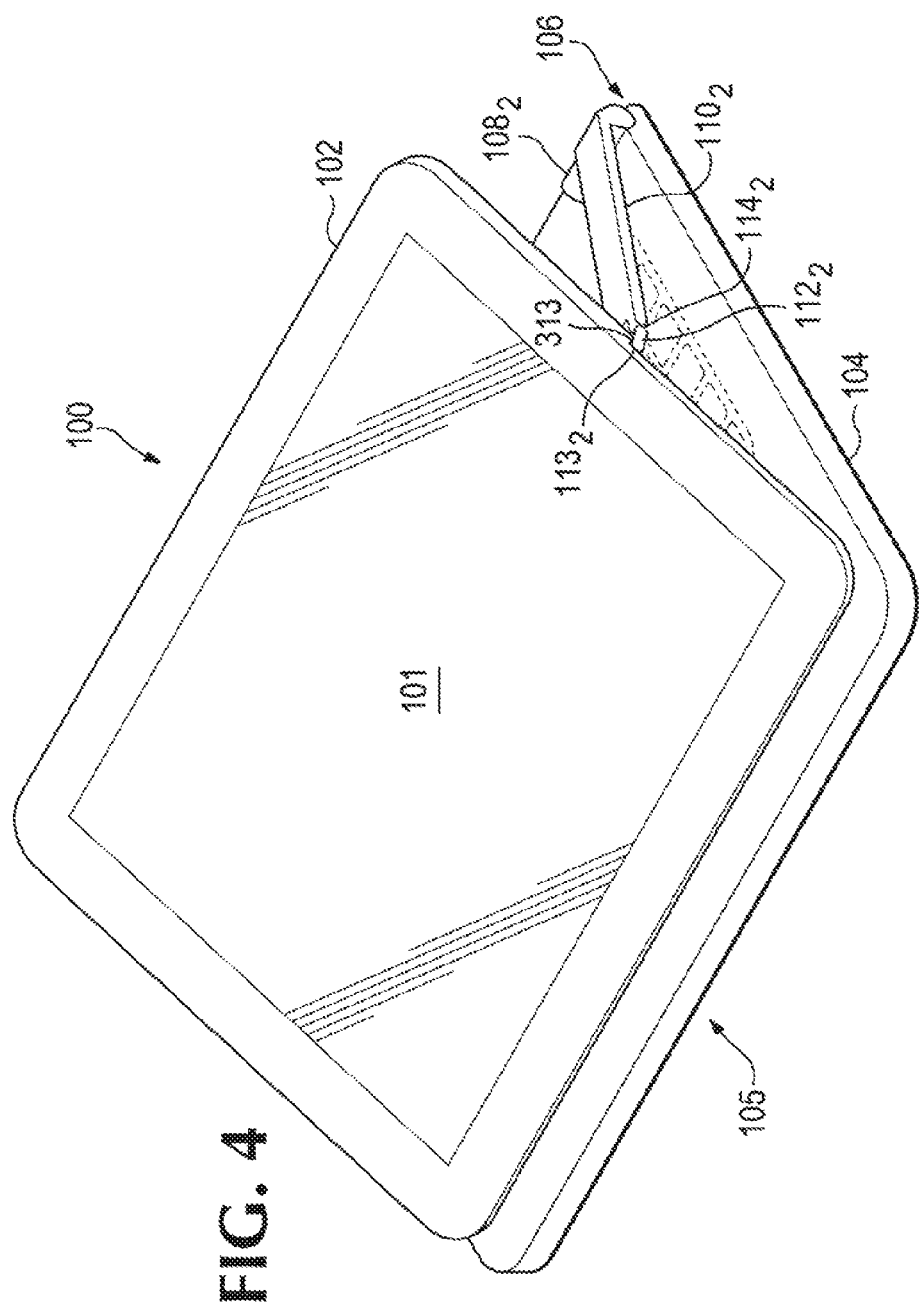
Figure 5:
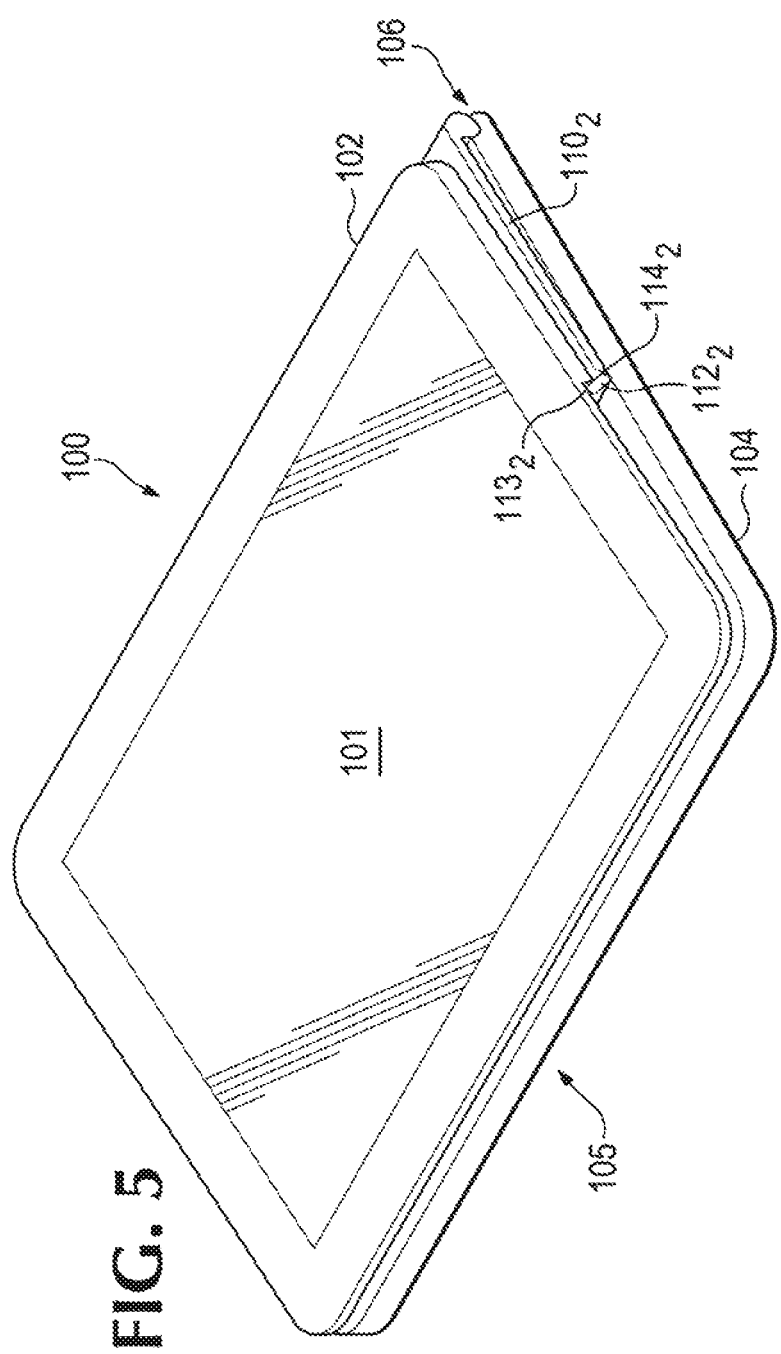
FIG. 5 illustrates the laptop in tablet mode, according, to an example.

In order for the laptop 100 to be operated in the various modes illustrated in FIGS. 3-5, the third and fourth hinges 112₁, 112₂ may be friction hinges that provide friction for resisting a torque provided by a user while operating the laptop 100 and changing between the various modes illustrated. As an example, the first pivot points 113₁, 113₂ of the third and fourth hinges 112₁, 112₂ may have a first frictional value, and the second pivot points 114₁, 114₂ of the third and fourth hinges 112₁, 112₂ may have a second frictional value different from the first frictional value. As an example, clutches with different frictional values may be added to each set of pivot points. For example, clutches with a first frictional value may be added to the first pivot points 113₁, 113₂, and clutches with a second frictional value may be added to the second pivot points 114₁, 114₂. As a result, the set of pivot points with a higher frictional value may r fixed as the set of pivot points with the lower frictional value may rotate until a hard stop (or full stop) is reached. Thereafter, the set of pivot points with the higher frictional value may then rotate, as will be illustrated in FIGS. 3-5.

Referring to FIG. 3, the first pivot points 113₁, 113₂ may have a lower frictional value than the second pivot points 114₁, 114₂, according to an example. As a result, as the display member 102 is adjusted to operate in the mode illustrated, the first pivot points 113₁, 113₂ of the third and fourth hinges 112₁, 112₂ may rotate and the second pivot points 114₁, 114₂ may remain fixed, as illustrated, Referring to FIG. 4, as the display member 102 of the laptop 100 continues to be adjusted (e.g., from position illustrated in FIG. 3), the first pivot points 113₁, 113₂ of the third and fourth hinges 112₁, 112₂ may continue to rotate until a hard stop is reached at 313. Thereafter, the second pivot points 114₁, 114₂ may then rotate, in order to operate the laptop in the mode illustrated in FIG. 4. Finally, referring to FIG. 5, the display member 102 and base member 104 may be collapsed against each other in the open, folded position. As the first pivot points 113₁, 113₂ of the third and fourth hinges 112₁, 112₂ have reached the hard stop 313 for the mode illustrated in FIG. 4, the second pivot points 114₁, 114₂ may continue to rotate to operate the laptop 100 as a tablet in the open, folded position.

Although the figures illustrate the hinge assembly of the laptop 100 including two supports 110₁, 110₂, the hinge assembly of the laptop 100 may include only a single support, according to n example. The single support may be disposed outside the perimeter of the display surface 101 of the display member 102, in order to minimize the thickness of the display member, as described above.

It is appreciated that examples described herein below may include various components and features. It is also appreciated that, in the following description, numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A computing device comprising:
    a base member including a front side and a back side opposite the front side;
    a hinge assembly comprising:
        a first hinge attached along the back side of the base member;
        a first support attached to the first hinge;
        a second hinge attached along the back side of the base member; and
        a second support attached to the second hinge, wherein the first support and second support are spaced apart; and
    a display member including a display surface, two opposite side surfaces with lengths equal to a width of the display surface, and a back surface opposite the display surface, wherein the back surface of the display member is attached to the first and second supports via a third and a fourth hinges, respectively, wherein the first and second supports and the third and fourth hinges are flushed with the back surface and the corresponding side surfaces of the display member.

2. The computing device of claim 1, wherein:
    a first pivot point of the third hinge and a first pivot point of the fourth hinge is attached to the back surface of the display member, and
    a second pivot point of the third hinge and a second pivot point of the fourth hinge is attached to the first and second supports, respectively.

3. The computing device of claim 2, wherein the first pivot points of the third and fourth hinges have a first frictional value, and the second pivot points of the third and fourth hinges have a second frictional value different from the first frictional value.

4. The computing device of claim 3, wherein the display member is to rotate via the second pivot points of the third and fourth hinges after reaching a full stop via the first pivot points of the third and fourth hinges.

5. A computing device comprising:
    a base member including a front side and a back side opposite the front side;
    a display member including a display surface, two opposite side surfaces with lengths equal to a width of the display surface, and a back surface opposite the display surface; and
    a hinge assembly for coupling the base member and the display member, the hinge assembly comprising:
        a first hinge attached along the back side of the base member;
        a first support attached to the first hinge, wherein the back surface of the display member is attached to the first support via a third hinge, wherein the first support and the third hinge are flushed with the back surface and the corresponding side surface of the display member.

6. The computing device of claim 5, wherein:
    the first support is attached to the back surface of the display member via a second hinge having two pivot points.

7. The computing device of claim 6, wherein:
    a first pivot point of the second hinge is attached to the back surface of the display member, and
    a second pivot point of the second hinge is attached to the first support.

8. The computing device of claim 7, wherein the first pivot point of the second hinge has a first frictional value, and the second pivot point of the second hinge has a second frictional value different from the first frictional value.

9. The computing device of claim 8, wherein the display member is to rotate via the second pivot point of the second hinge after reaching a full stop via the first pivot point of the second hinge.

10. The computing device of claim 5, wherein the hinge assembly comprises:
    a third hinge attached along the back side of the base member, wherein the first and third hinges are spaced apart;
    a second support attached to the third hinge, wherein the back surface of the display member is attached to the second support attached to the third hinge, wherein the second support is disposed along the back surface of the display member.

11. A hinge assembly for a computing device, the hinge assembly comprising:
    a first hinge attached along a back side of a base member of the computing device;
    a second hinge attached along a back surface of a display member of the computing device opposite a display surface of the display member, wherein the second hinge has two pivot points;
    a first support including a first end and a second end opposite the first end, wherein the first support is attached to the first hinge at the first end and attached to the second hinge at the second end, wherein the first support and the second hinge are flushed with a side surface and the back surface of the display; a length of the side surface equals to a width of the display surface.

12. The hinge assembly of claim 11, further comprising:
    a third hinge attached along the back side of the base member, wherein the first and third hinges are spaced apart;

a fourth hinge attached along the back surface of the display member, wherein the fourth hinge has two pivot points;

a second support including a third end and a fourth end opposite the third end, wherein the second support is attached to the third hinge at the third end and attached to the fourth hinge at the fourth end, wherein the second support is disposed along the back surface of the display member.

13. The hinge assembly of claim 12, wherein:

a first pivot point of the second hinge and a first pivot point of the fourth hinge is attached to the back surface of the display member, and a second pivot point of the second hinge and a second pivot point of the fourth hinge is attached to the first and second supports, respectively.

14. The hinge assembly of claim 13, wherein the first pivot points of the second and fourth hinges have a first frictional value, and the second pivot points of the second and fourth hinges have a second frictional value different from the first frictional value.

* * * * *